United States Patent [19]
Ikeda et al.

[11] Patent Number: 5,660,210
[45] Date of Patent: Aug. 26, 1997

[54] LAYERED RUBBER HOSE WITH REINFORCING

[75] Inventors: Fumio Ikeda; Satoshi Mizutani; Katsushi Kitaoka, all of Inazawa, Japan

[73] Assignee: Toyoda Gosei Co., Ltd., Nishikasugai-gun, Japan

[21] Appl. No.: 26,057

[22] Filed: Mar. 3, 1993

[30] Foreign Application Priority Data

| Mar. 5, 1992 | [JP] | Japan | 4-048534 |
| Dec. 28, 1992 | [JP] | Japan | 4-348530 |
| Dec. 28, 1992 | [JP] | Japan | 4-348536 |
| Dec. 28, 1992 | [JP] | Japan | 4-348539 |

[51] Int. Cl.$^6$ .......................... F16L 11/04
[52] U.S. Cl. .......................... 138/126; 138/124; 138/137
[58] Field of Search .......................... 138/103, 124, 138/125, 126, 127, 137

[56] References Cited

U.S. PATENT DOCUMENTS

| 3,116,760 | 1/1964 | Matthews | 138/125 |
| 3,159,183 | 12/1964 | Brumbach | 138/125 |
| 3,245,431 | 4/1966 | Coe | 138/125 |
| 3,605,818 | 9/1971 | Balchan | 138/126 |
| 3,722,550 | 3/1973 | Matthews | 138/137 |
| 3,750,712 | 8/1973 | Brand | 138/126 |
| 3,905,398 | 9/1975 | Johansen et al. | 138/125 |
| 4,273,160 | 6/1981 | Lowles | 138/125 |
| 4,276,908 | 7/1981 | Horne | 138/125 |
| 4,343,333 | 8/1982 | Keister | 138/125 |
| 4,617,213 | 10/1986 | Asano et al. | |
| 4,734,305 | 3/1988 | Sugimoto et al. | |
| 4,898,212 | 2/1990 | Searfoss et al. | 138/125 |
| 4,989,422 | 2/1991 | Barlow et al. | 138/125 |
| 4,998,565 | 3/1991 | Kokuryu et al. | |

*Primary Examiner*—Patrick Brinson
*Attorney, Agent, or Firm*—Cushman Darby & Cushman IP Group of Pillsbury Madison & Sutro LLP

[57] ABSTRACT

A reinforced hose includes an inner tubular rubber layer, a cover layer made of rubber, and at least two reinforcing thread layers, including an upper thread layer and a lower thread layer, disposed between the inner tubular rubber layer and the cover layer. At least the lower thread layer includes a polyester thread having the following physical properties: a tensile strength of 8 grams or more per a unit denier, an elongation of 10±1.5%, and a loaded elongation of 2.7±1.0% per a unit denier under 3-gram load. With this construction, the reinforced hose satisfies the fatigue resistance and volume expansion requirements simultaneously.

13 Claims, 1 Drawing Sheet

LAYERED RUBBER HOSE WITH REINFORCING

BACKGROUND OF THE INVENTION

1. Field of the Invention

The present invention relates to a layered rubber hose with reinforcing which is used for passage of a pressurized fluid, e.g., a hydraulic rubber hose, or the like, and in which reinforcing thread layers are braided around successive rubber layers.

2. Description of the Related Art

Some hoses are used for passage of a pressurized fluid, e.g., a hydraulic hose, or the like. The hose is required to have such a strength that it can withstand a high pressure. In many cases, hoses made of rubber resin, or the like usually suffer from insufficiency in high pressure strength. Accordingly, a hose having a reinforcing thread layer at the intermediate portion of the rubber layer has been used in general. The reinforcing thread layer is usually formed of braided reinforcing threads. However, a hose having a single reinforcing thread layer cannot withstand high pressure satisfactorily in some applications. When such is the case, a hose having a plurality of reinforcing thread layers has been used widely.

As the material of the thread constituting the reinforcing thread layer, there have been vinylon (a trademark of polyvinyl alcohol in Japan), polyester, rayon, aramid fiber, and the like. These thread materials are used depending on specific applications and at the same time making the best use of their characteristics.

SUMMARY OF THE INVENTION

A layered rubber hose with reinforcing (hereinafter simply reinforced hose) using the aforementioned thread materials have different characteristics, respectively. Table 1 below summarizes the difference in the characteristics, e.g., fatigue resistance and volume expansion. Here, fatigue resistance refers to the durability of the reinforced hoses when they are repeatedly flexed at a high temperature while they are repeatedly subjected to a high pressure. Volume expansion refers to the variation of the inner volume of reinforced hoses when a highly pressurized fluid is supplied to them, and it is usually preferable that the hoses exhibit a low volume of expansion.

TABLE 1

| Reinforcing Thread Material | Fatigue Resistance | Volume Expansion |
| --- | --- | --- |
| Vinylon | Satisfactory | Very Small |
| Polyester | Excellent | Small |
| Rayon | Satisfactory | Small |
| Aramid Fiber | Slightly Poor | Very Small |

As can be summarized in Table 1, there has been no reinforcing thread which satisfies both characteristics, i.e., fatigue resistance and volume expansion, simultaneously, and the characteristics are believed to be contradictory phenomena. Therefore, in a reinforced hose having a plurality of the reinforcing thread layers, the thread materials of the lower thread layer and the upper thread layer are varied relative to each other in order to reconcile the characteristics. However, no construction has yet satisfactorily effected the reconciliation of these two contradictory characteristics.

The present invention has been developed in view of such circumstances. It is therefore an object of the present invention to satisfy the fatigue resistance and the volume expansion requirements simultaneously in a reinforced hose.

The present inventors conducted extensive research and development on the relationships between the various physical properties of the reinforcing threads and the fatigue resistance as well as the volume expansion of the reinforced hose. As a result, they discovered that a reinforcing thread made from a polyester thread of a, specific kind satisfies the fatigue resistance and the volume expansion requirements simultaneously. Further, they discovered that it is advantageous to form at least a lower thread layer of a plurality of reinforcing thread layers, preferably an upper thread layer thereof as well, with the polyester thread in order to improve the hose characteristics further, and that it is effective to braid at least the lower thread layer with the polyester thread under predetermined braiding conditions in order to enhance the hose characteristics still further. Furthermore, they verified that the lower thread layer formed of the polyester thread so conforms to an upper thread layer formed of polyvinyl alcohol thread that the resulting reinforced hose best satisfies the fatigue resistance and the volume expansion requirements simultaneously. The present inventors thus completed one embodiment of a reinforced hose according to the present invention as follows:

an inner tube made of rubber;

a cover layer made of rubber and formed over the inner tube;

at least two reinforcing thread layers, including an upper thread layer and a lower thread layer, disposed between the inner tube and the cover layer; and at least the lower thread layer including a polyester, thread having the following physical properties;

a tensile strength of 8 grams or more per unit denier;

an elongation of 10±1.5%; and a loaded elongation of 2.7±1.0% per unit denier under 3-gram load.

In the present reinforced hose, the polyester thread constituting at least the lower thread layer of the reinforcing thread layers has a tensile strength of 8 grams or more per unit denier. When the tensile strength per unit denier is less than 8 grams, the resulting reinforced hose has an insufficient burst strength characteristic.

Further, the polyester thread has an elongation of 10±1.5%. When the elongation is less than 85%, the resulting reinforced hose has unsatisfactory fatigue resistance. On the other hand, when the elongation is more than 11.5%, the other physical properties of the polyester thread, e.g., the tensile strength per unit denier, the loaded elongation per unit denier under 3-gram load, and the like, are adversely affected. For instance, the tensile strength of the polyester thread per unit denier becomes less than 8 grams, and accordingly insufficient burst strength is provided for the resulting reinforced hose. As described below, if the loaded elongation of the polyester thread per unit denier under 3-gram load becomes more than 3.7%, the resulting reinforced hose exhibits a larger volume expansion.

Furthermore, the polyester thread has a characterized by a loaded elongation of 2.7±1.0% per a unit denier under 3 gram load. When the loaded elongation per a unit denier under 3-gram load is more than 3.7%, the resulting reinforced hose comes to exhibit a larger volume expansion. On the other hand, when the loaded elongation per a unit denier under 3-gram load is less than 1.7%, the other physical properties of the polyester thread, e.g., the tensile strength per unit denier, the elongation, and the like, are adversely affected. For instance, the tensile strength of the polyester thread per unit denier becomes less than 8 grams, and accordingly insufficient burst strength is provided for the resulting reinforced hose. If the elongation of the polyester thread becomes less than 8.5%, no satisfactory fatigue resistance is provided for the resulting reinforced hose.

In the present reinforced hose, the polyester thread constituting at least the lower thread layer of the reinforcing thread layers needs to satisfy the physical properties requirement, because the characteristics of the reinforced hose depend greatly on the physical properties of the reinforcing thread constituting the lowermost thread layer of the reinforcing thread layers. The polyester thread satisfying the aforementioned physical properties will be hereinafter referred to as the reinforced polyester (PE) thread.

Of course, the other reinforcing thread layers, e.g., the upper thread layer, can be made of the reinforced PE thread as described below. If such is the case, the present reinforced hose has exceptionally good performance accordingly.

Moreover, in the present reinforced hose, it is preferred that at least the lower thread layer is braided with the reinforced PE thread under a braiding condition selected from the following 3 braiding conditions: (a) Two (2) continuous strands of the reinforced PE thread are supplied from 20 carriers or cheeses disposed circularly on a braiding machine (hereinafter simply expressed as a 2S-20C braiding condition), (b) a 2S-24C braiding condition, (c) a 3S-20C braiding condition, and (d) a 3S-24C braiding condition. Here, it is particularly preferred to form the lower thread layer with the reinforced PE thread under one of the latter three braiding conditions, e.g., (b) the 2S-24C braiding condition, (c) the 3S-20C braiding condition, and (d) the 3S-24C braiding condition. If such is the case, the resulting present reinforced hose comes to exhibit well balanced fatigue resistance and volume expansion. When the amount of the reinforced PE thread braided is less than the amounts resulting from these braiding conditions, the reinforced hose might sometimes be a bit unsatisfactory in fatigue resistance, or the like. On the other hand, when the amount is more than the amounts resulting therefrom, the reinforcing thread layer is irregular heavily so that the hose characteristics might be degraded because of the excess amount.

Although the braiding condition for the upper thread layer is not specified in the present reinforced hose, it is preferred that the upper thread layer is also formed by braiding the reinforced BE thread under one of the aforementioned braiding conditions for the lower thread layer, e.g., the 2S-24C, 3S-20C and 3S-24C braiding conditions. If such is the case, the resulting present reinforced hose has a further enhanced fatigue resistance.

In addition, it is not required that the upper thread layer include the reinforced PE thread. For example, the upper thread layer can include a polyvinyl alcohol thread, e.g., the vinylon thread. When the lower thread layer is formed by braiding the reinforced PE thread under one of the aforementioned 2S-24C, 3S-20C and 3S-24C braiding conditions and the upper thread layer includes a polyvinyl alcohol thread, the resulting reinforced hose has the best balance of fatigue resistance and volume expansion. This results from the fact that the polyvinyl alcohol thread results in an extremely small volume expansion. Namely, in such a reinforced hose, the lower thread layer formed by braiding the reinforced PE thread ensures fatigue resistance, it suppresses volume expansion because the reinforced PE thread results in less volume expansion than the conventional polyester threads do, and the upper thread layer formed by braiding the polyvinyl alcohol thread further suppresses volume expansion. Thus, the resulting present reinforced hose best satisfies the fatigue resistance and volume expansion requirements simultaneously.

As described so far, the present reinforced hose comprises at least a lower thread layer which is formed by braiding the reinforced PE thread, and the reinforced PE thread has the following physical properties: a tensile strength of 8 grams or more per a unit denier; an elongation of 10±1.5%; and a loaded elongation of 2.7±1.0% load per unit denier under 3-gram. With this construction, the present reinforced hose can be made into one which has good fatigue resistance and less volume expansion simultaneously.

In particular, the present reinforced hose, is superb in fatigue resistance when it is repeatedly subjected to a high pressure and when it is repeatedly flexed at a high temperature, and accordingly it is remarkably improved durability. Moreover, the present reinforced hose varies in volume less when it is subjected to a high pressure, and consequently the present reinforced hose can convey the fluid pressure securely. Thus, the present reinforced hose satisfies the fatigue resistance and volume expansion requirements simultaneously.

BRIEF DESCRIPTION OF THE DRAWINGS

A more complete appreciation of the present invention and many of its advantages will be readily obtained as the same becomes better understood by reference to the following detailed description when considered in connection with the accompanying drawing and detailed specification, all of which form a part of the disclosure.

DETAILED DESCRIPTION OF THE PREFERRED EMBODIMENTS

Figure 1:
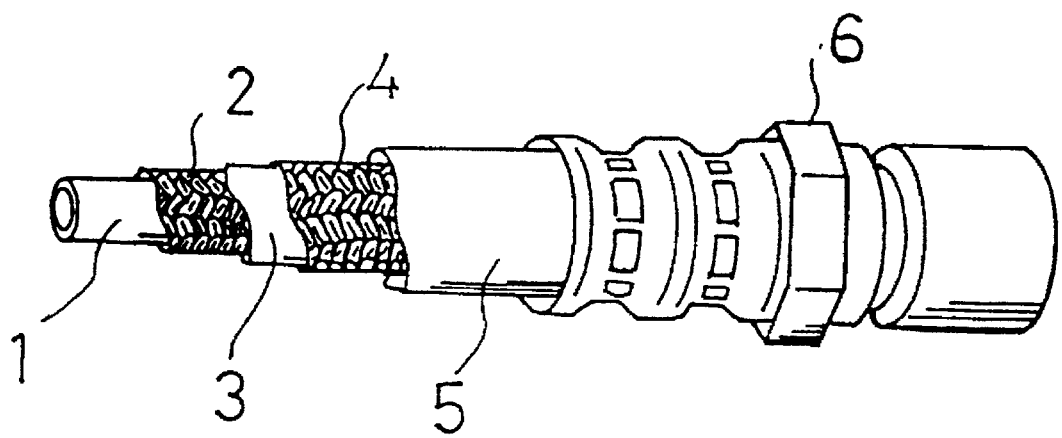
FIG. 1 is a perspective view for illustrating the construction of a First Preferred Embodiment of the present reinforced hose.

Having generally described the present invention, a further understanding can be obtained by reference to the specific preferred embodiments which are provided herein for purposes of illustration only and are not intended to limit the scope of the appended claims.

First Preferred Embodiment

In FIG. 1, there is illustrated the First Preferred Embodiment of the present reinforced hose with an end-fitting crimped. The First Preferred Embodiment of the present reinforced hose is useful as an automotive high pressure hose, and it includes a tubular rubber layer 1, i.e., the innermost layer, a lower or inner thread layer 2 braided on the surface of the tubular rubber layer 1, an intermediate rubber layer 3 covering the surface of the lower thread layer 2, an upper or outer thread layer 4 braided on the surface of the intermediate rubber layer 3, and a cover rubber layer 5 covering the surface of the upper thread layer 4. Further, an end-fitting 6 is crimped at an end of the reinforced hose.

The tubular rubber layer 1 is made of styrene-butadiene rubber (hereinafter simply referred to as "SBR").

The lower thread layer 2 is a braid formed by braiding a 1,500-denier reinforced PE thread under the 2S-20C braiding condition. The reinforced PE thread has the following physical properties: a tensile strength of 9.0 grams per a unit denier; an elongation of 10.0%; and a loaded elongation of 2.7% per a unit denier under 3-gram load.

The intermediate rubber layer 3 is made of natural rubber (hereinafter simply referred to as "NR").

The upper thread layer 4 is a braid formed by braiding a 1,200-denier vinylon thread under the 3S-24C braiding condition. The vinylon thread had the following physical properties: a tensile strength of 8.3 grams per a unit denier; an elongation of 7.0%; and a loaded elongation of 2.5% per a unit denier under 3-gram load.

The cover rubber layer 5 is made of chroloprene rubber (hereinafter simply referred to as "CR").

The thus constructed First Preferred Embodiment of the present reinforced hose was evaluated for volume expansion, fatigue resistance and burst strength, and the results of the evaluations are set forth in Table 2 below. Here, the volume expansion test was carried out in accordance with JIS (Japanese Industrial Standards) No. 2,601; namely, the present reinforced hose was out to a free length of 305 mm, it was subjected to a pressure of 105 kgf/cm$^2$, and it was examined for variation in the inner volume. The fatigue resistance test was carried out by repeatedly flexing the present reinforced hose at 100° C. while applying a pressure of 100 kgf/cm$^2$ thereto, and the present reinforced hose was examined to determine how many times it could be flexed repeatedly before it burst. The burst strength test was carried out in accordance with JIS No. 2,601; namely, the present reinforced hose was subjected to a hydraulic pressure which increased at a pressurizing speed of 1,750±700 kgf/cm$^2$ per minute, and the present reinforced hose was examined to determine how much hydraulic pressure it was subjected to when it was burst.

COMPARATIVE EXAMPLE NO. 1

Comparative Example No. 1 of a reinforced hose was prepared. It had the same construction as that of the First Preferred Embodiment of the present reinforced hose except that the lower thread layer 2 was formed by braiding the 1,200-denier vinylon thread under the 2S-20C braiding condition. Comparative Example No. 1 was also evaluated for the characteristics in the same manner described in the above "First Preferred Embodiment" section, and the results of the evaluations are also set forth in Table 2 below.

COMPARATIVE EXAMPLE NO. 2

Comparative Example No. 2 of a reinforced hose was prepared. It had the same construction as that of the First Preferred Embodiment of the present reinforced hose except that the lower thread layer 2 was formed by braiding a 1,500-denier polyester thread under the 2S-20C braiding condition, the upper thread layer 4 was formed by braiding the 1,500-denier polyester thread under the 3S-24C braiding condition, and the 1,500-denier polyester thread had the following physical properties: a tensile strength of 8.7 grams per a unit denier; an elongation of 14.0%; and a loaded elongation of 4.0% per a unit denier under 3-gram load. This polyester thread will be hereinafter simply referred to as a conventional PE thread. Comparative Example No. 2 was also evaluated for the characteristics in the same manner described in the above "First Preferred Embodiment" section, and the results of the evaluations are also set forth in Table 2 below.

TABLE 2

| | 1st Pref. Embodiment | Comp. Ex. No. 1 | Comp. Ex. No. 2 |
| --- | --- | --- | --- |
| Lower Thread Layer | | | |
| Thread Material | Reinforced PE | Vinylon | Conventional PE |
| Tensile Strength (gram/D) | 9.0 | 8.3 | 8.7 |
| Elongation (%) | 10.0 | 7.0 | 14.0 |
| 3 gram-Loaded Elongation (%) | 2.7 | 2.5 | 4.0 |
| Upper Thread Layer | | | |
| Thread Material | Vinylon | Vinylon | Conventional PE |
| Tensile Strength (gram/D) | 8.3 | 8.3 | 8.7 |
| Elongation (%) | 7.0 | 7.0 | 14.0 |
| 3 gram-Loaded Elongation (%) | 2.5 | 2.5 | 4.0 |
| Volume Expansion (cm$^3$) | 0.18 Good | 0.16 Good | 0.25 Fair |
| Fatigue Resistance (times) | 1-million or more | 0.3-million | 1-million |
| Burst Strength (kgf/cm$^2$) | 1,050 Good | 800 Good | 1,000 Good |

It is understood from Table 2 above that Comparative Example No. 1 whose lower thread layer 2 was formed by braiding the vinylon thread had the inferior fatigue resistance of 0.3 million times, and that Comparative Example No. 2 whose lower thread layer 2 was formed by braiding the conventional PE thread had the enlarged volume expansion of 0.25 cm$^3$ which was fairly larger than 0.2 cm$^3$. On the other hand, the First Preferred Embodiment of present reinforced hose had satisfactory characteristics in both fatigue resistance and volume expansion, and it had optimum performance as a high pressure hose. It is apparent that this advantageous effect resulted from the construction that the lower thread layer 2 was formed by braiding the reinforced PE thread having the predetermined physical properties.

Second Preferred Embodiment

The construction of a Second Preferred Embodiment of the present reinforced hose was basically identical with that of the First Preferred Embodiment illustrated in FIG. 1, and it will not be detailed herein except for the following features.

Namely, in the Second Preferred Embodiment of the present reinforced hose, the tube rubber layer 1 was formed of ethylene-propylene terpolymer (hereinafter simply referred to as "EPDM").

The lower thread layer 2 was formed by braiding the 1,500-denier reinforced PE thread, which was used to braid the lower thread layer 2 of the First Preferred Embodiment, under the 2S-20C braiding condition.

The upper thread layer 4 was formed by braiding the 1,500-denier reinforced PE thread under the 3S-24C braiding condition.

The cover rubber layer 5 was formed of EPDM.

The thus constructed Second Preferred Embodiment of the present reinforced hose was also evaluated for volume expansion and fatigue resistance in the same manner described in the above "First Preferred Embodiment" section, and the results of the evaluations are set forth in Table 3 below.

Third Preferred Embodiment

A Third Preferred Embodiment of the present reinforced hose was prepared. It had the same construction as that of the Second Preferred Embodiment except that the lower thread layer 2 was formed by braiding the 1,500-denier reinforced PE thread under the 2S-24C braiding condition. The Third Preferred Embodiment was also evaluated for the characteristics in the same manner described in the above "First Preferred Embodiment" section, and the results of the evaluations are also set forth in Table 3 below.

Fourth Preferred Embodiment

A Fourth Preferred Embodiment of the present reinforced hose was prepared. It had the same construction as that of the Second Preferred Embodiment except that the lower thread layer 2 was formed by braiding the 1,500-denier reinforced PE thread under the 3S-20C braiding condition. The Fourth Preferred Embodiment was also evaluated for the characteristics in the same manner described in the above "First Preferred Embodiment" section, and the results of the evaluations are also set forth in Table 3 below.

Fifth Preferred Embodiment

A Fifth Preferred Embodiment of the present reinforced hose was prepared. It had the same construction as that of the Second Preferred Embodiment of the present reinforced hose except that the lower thread layer 2 was formed by braiding the 1,500-denier reinforced PE thread under the 3S-24C braiding condition. The Fifth Preferred Embodiment was also evaluated for the characteristics in the same manner described in the above "First Preferred Embodiment" section, and the results of the evaluations are also set forth in Table 3 below.

COMPARATIVE EXAMPLE No. 3

Comparative Example No. 3 of a reinforced hose was prepared. It had the same construction as that of the Second Preferred Embodiment of the present reinforced hose except that the lower thread layer 2 was formed by braiding the 1,500-denier conventional PE thread under the 2S-20C braiding condition, and that the upper thread layer 4 was formed by braiding the 1,500-denier conventional PE thread under the 3S-24C braiding condition. Comparative Example No. 3 was also evaluated for the characteristics in the same manner described in the above "First Preferred Embodiment" section, and the results of the evaluations are also set forth in Table 3 below.

COMPARATIVE EXAMPLE NO. 4

Comparative Example No. 4 of a reinforced hose was prepared. It had the same construction as that of the Second Preferred Embodiment of the present reinforced hose except that the lower thread layer 2 was formed by braiding the 1,200-denier vinylon thread under the 2S-20C braiding condition, and that the upper thread layer 4 was formed by braiding the 1,200-denier vinylon thread under the 3S-24C braiding condition. Comparative Example No. 4 was also evaluated for the characteristics in the same manner described in the above "First Preferred Embodiment" section, and the results of the evaluations are also set forth in Table 3 below.

TABLE 3

| | Lower Thread Layer | | Upper Thread Layer | | Fatigue | Volume |
|---|---|---|---|---|---|---|
| | Thread Material | Braiding Condition | Thread Material | Braiding Condition | Resistance (times) | Expansion ($cm^3$) |
| 2nd Pref. Embodiment | Reinforced PE | 2S-20C | Reinforced PE | 3S-24C | 0.6-million | 0.21 |
| 3rd Pref. Embodiment | Reinforced PE | 2S-24C | Reinforced PE | 3S-24C | 1.5-million | 0.20 |
| 4th Pref. Embodiment | Reinforced PE | 3S-20C | Reinforced PE | 3S-24C | 4.5-million | 0.20 |
| 5th Pref. Embodiment | Reinforced PE | 3S-24C | Reinforced PE | 3S-24C | 5.4-million | 0.18 |
| Comp. Ex. No. 3 | Conventional PE | 2S-20C | Conventional PE | 3S-24C | 0.4-million | 0.25 |
| Comp. Ex. No. 4 | Vinylon | 2S-20C | Vinylon | 3S-24C | 0.25-million | 0.16 |

It is understood from Table 3 above that only the Second through Fifth Preferred Embodiments had satisfactory characteristics in both fatigue resistance and the volume expansion, and that they had optimum performance as a high pressure hose. In particular, the Third through Fifth Preferred Embodiments were exceptionally good in fatigue resistance. It is apparent that this advantageous effect resulted from the construction that the lower thread layer 2 was formed by braiding the reinforced PE thread having the predetermined physical properties under one of the predetermined braiding conditions, and that the upper thread layer 4 was also formed by braiding the reinforced PE thread.

Sixth Preferred Embodiment

The construction of a Sixth Preferred Embodiment of the present reinforced hose was basically identical with that of the First Preferred Embodiment illustrated in FIG. 1, and it will not be detailed herein except for the following features.

Namely, in the Sixth Preferred Embodiment of the present reinforced hose, the tube rubber layer 1 was formed of EPDM.

The cover rubber layer 5 was formed of EPDM.

The thus constructed Sixth Preferred Embodiment of the present reinforced hose was also evaluated for volume expansion and fatigue resistance in the same manner described in the above "First Preferred Embodiment" section, and the results of the evaluations are set forth in Table 4 below.

Seventh Preferred Embodiment

A Seventh Preferred Embodiment of the present reinforced hose was prepared. It had the same construction as that of the Sixth Preferred Embodiment except that the lower thread layer 2 was formed by braiding the 1,500-denier reinforced PE thread under the 2S-24C braiding condition. The Seventh Preferred Embodiment was also evaluated for the characteristics in the same manner described in the above "First Preferred Embodiment" section, and the results of the evaluations are also set forth in Table 4 below.

Eighth Preferred Embodiment

An Eighth Preferred Embodiment of the present reinforced hose was prepared. It had the same construction as that of the Sixth Preferred Embodiment except that the lower thread layer 2 was formed by braiding the 1,500-denier reinforced PE thread under the 3S-20C braiding condition. The Eighth Preferred Embodiment was also evaluated for the characteristics in the same manner described in the above "First Preferred Embodiment" section, and the results of the evaluations are also set forth in Table 4 below.

Ninth Preferred Embodiment

A Ninth Preferred Embodiment of the present reinforced hose was prepared. It had the same construction as that of the Sixth Preferred Embodiment except that the lower thread layer 2 was formed by braiding the 1,500-denier reinforced PE thread under the 3S-24C braiding condition. The Ninth Preferred Embodiment was also evaluated for the characteristics in the same manner described in the above "First Preferred Embodiment" section, and the results of the evaluations are also set forth in Table 4 below.

COMPARATIVE EXAMPLE NO. 5

Comparative Example No. 5 of a reinforced hose was prepared. It had the same construction as that of the Sixth Preferred Embodiment of the present reinforced hose except that the lower thread layer 2 was formed by braiding the 1,500-denier conventional PE thread under the 2S-20C braiding condition. Comparative Example No. 5 was also evaluated for the characteristics in the same manner described in the above "First Preferred Embodiment" section, and the results of the evaluations are also set forth in Table 4 below together with those of aforementioned Comparative Example No. 4 for reference.

TABLE 4

| | Lower Thread Layer | | Upper Thread Layer | | Fatigue Resistance (times) | Volume Expansion (cm³) |
|---|---|---|---|---|---|---|
| | Thread Material | Braiding Condition | Thread Material | Braiding Condition | | |
| 6th Pref. Embodiment | Reinforced PE | 2S-20C | Vinylon | 3S-24C | 2.5-million | 0.18 |
| 7th Pref. Embodiment | Reinforced PE | 2S-24C | Vinylon | 3S-24C | 4.0-million | 0.17 |
| 8th Pref. Embodiment | Reinforced PE | 3S-20C | Vinylon | 3S-24C | 6.0-million | 0.17 |
| 9th Pref. Embodiment | Reinforced PE | 3S-24C | Vinylon | 3S-24C | 7.0-million | 0.16 |
| Comp. Ex. No. 5 | Conventional PE | 2S-20C | Vinylon | 3S-24C | 1.0-million | 0.19 |
| Comp. Ex. No. 4 | Vinylon | 2S-20C | Vinylon | 3S-24C | 0.25-million | 0.16 |

It is understood from Table 4 above that only the Sixth through Ninth Preferred Embodiments had exceptionally good characteristics in both fatigue resistance and volume expansion, and that they had the best performance as a high pressure hose. It is apparent that this advantageous effect resulted from the construction that the lower thread layer 2 was formed by braiding the reinforced PE thread having the predetermined physical properties under one of the predetermined braiding conditions, and that the upper thread layer 4 was formed by braiding the vinylon thread.

In addition, in the First through Ninth Preferred Embodiments described above, the tube rubber layer 1, the intermediate rubber layer 3 and the cover rubber layer 5 were formed of either SBR or EPDM, NR and either CR or EPDM, respectively. However, the tube rubber layer 1, the intermediate rubber layer 3 and the cover rubber layer 5 can be formed of SBR, NR and EPDM, respectively.

Having now fully described the present invention, it will be apparent to one of ordinary skill in the art that many changes and modifications can be made thereto without departing from the spirit or scope of the present invention as set forth herein including the appended claims.

What is claimed is:

1. A layered rubber hose with reinforcing, comprising:

an inner tube made of rubber;

an inner reinforcing thread layer comprised of polyester thread having the following physical properties; a tensile strength per unit denier of 8 grams or more, an elongation of 10±1.5%, and a loaded elongation per unit denier of 2.7±1.0% under a 3-gram load; and disposed over said inner tube;

an intermediate rubber layer disposed over said inner reinforcing thread layer;

an outer reinforcing thread layer, formed by braiding polyvinyl alcohol thread, disposed over said intermediate rubber layer; and a cover layer made of rubber formed over said outer reinforcing thread layer.

2. The layered rubber hose according to claim 1, wherein said outer reinforcing thread layer is further formed by braiding under one of said braiding conditions: 2S-24C, 3S-20C and 3S-24C braiding conditions.

3. The layered rubber hose according to claim 1, wherein said inner reinforcing thread layer is formed by braiding said polyester thread under one of the following braiding conditions: 2S-24C, 3S-20C and 3S-24C braiding conditions.

4. The layered rubber hose according to claim 3, wherein said outer reinforcing thread layer is formed by braiding said polyvinyl alcohol thread under one of the following braiding conditions: 2S-24C, 3S-20C and 3S-24C braiding conditions.

5. The layered rubber hose according to claim 1, wherein said inner tube includes SBR, and said cover layer includes CR.

6. The layered rubber hose according to claim 1, wherein said inner tube includes SBR, and said cover layer includes EPDM.

7. The layered rubber hose according to claim 1, wherein said inner tube and said cover layer include EPDM.

8. The layered rubber hose according to claim 1, wherein said intermediate rubber layer includes NR.

9. The layered rubber hose according to claim 1, wherein said inner tube is made of SBR, and said cover layer is made of CR.

10. The layered rubber hose according to claim 1, wherein said inner tube is made of SBR, and said cover layer is made of EPDM.

11. The layered rubber hose according to claim 1, wherein said inner tube and said cover layer are made of EPDM.

12. The layered rubber hose according to claim 1, wherein said inner reinforcing thread layer is formed by braiding said polyester thread under one of the following braiding conditions: 2S-24C, 3S-20C and 3S-24C braiding conditions.

13. The layered rubber hose according to claim 1, wherein said loaded elongation per unit denier under 3-gram load of said inner reinforcing thread layer is smaller than that of said outer reinforcing thread layer.

* * * * *